Oct. 4, 1932.   E. WILDHABER   1,881,382
METHOD OF AND MEANS FOR PERFECTING GEARS AND GEAR SHAPED ARTICLES
Filed Feb. 11, 1929   4 Sheets-Sheet 1
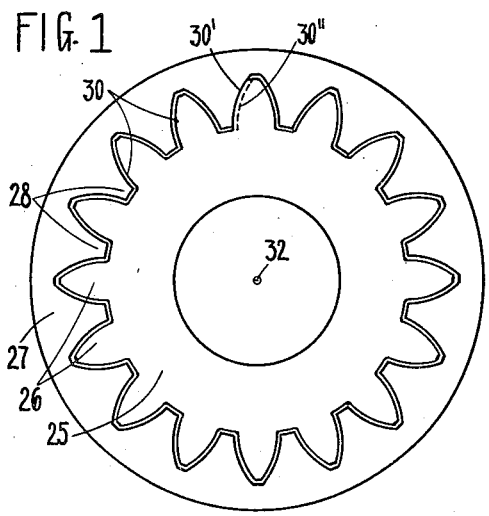
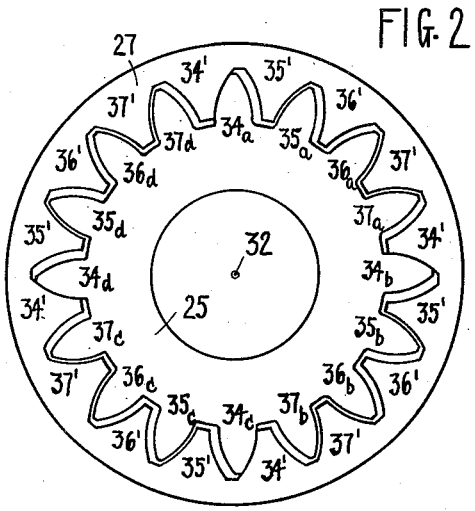
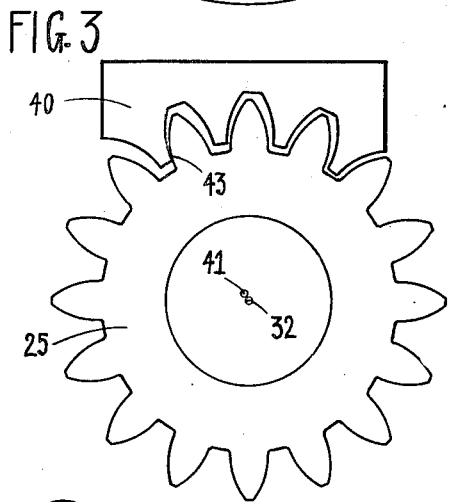
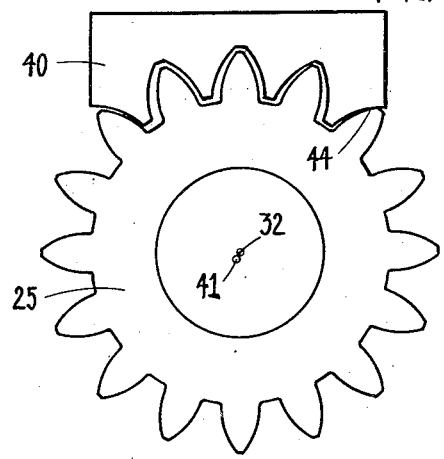
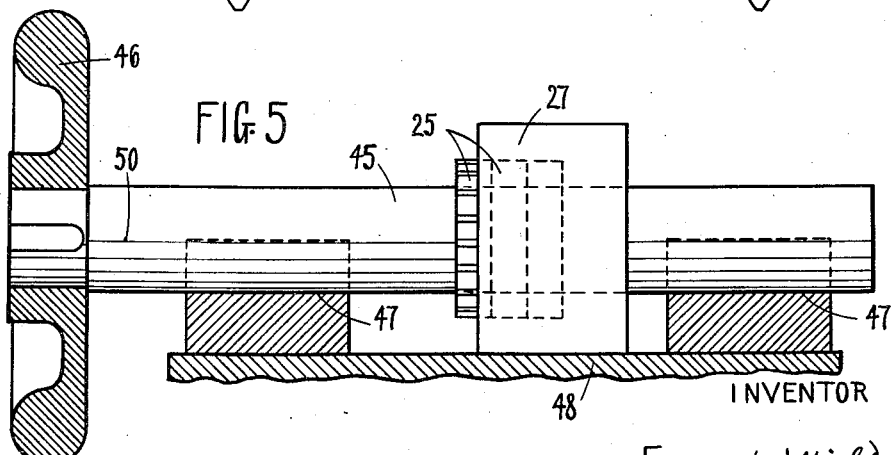
INVENTOR
Ernest Wildhaber Oct. 4, 1932.   E. WILDHABER   1,881,382
METHOD OF AND MEANS FOR PERFECTING GEARS AND GEAR SHAPED ARTICLES
Filed Feb. 11, 1929   4 Sheets-Sheet 2
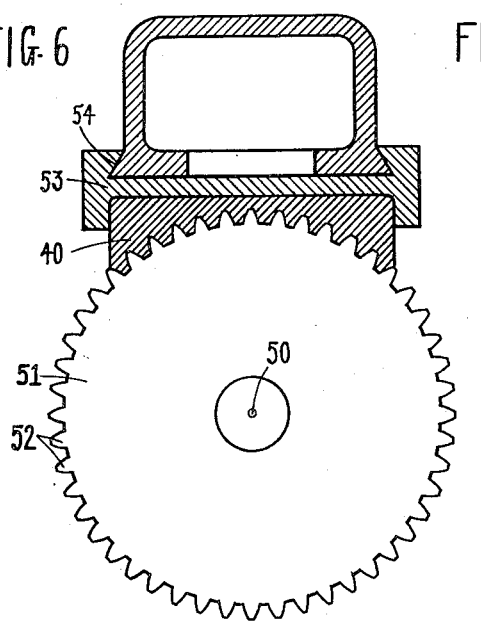
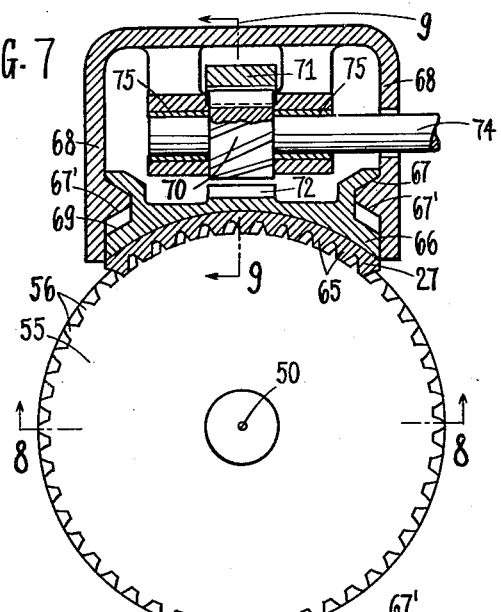
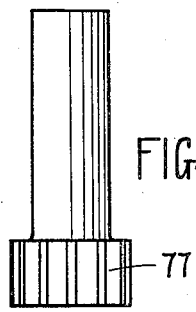
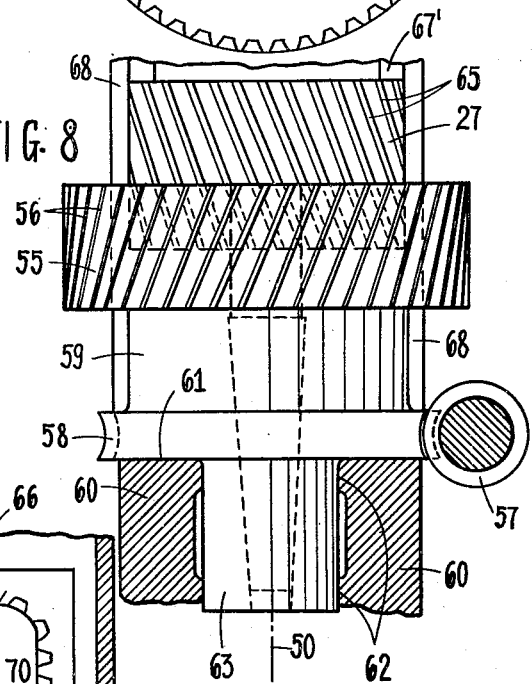
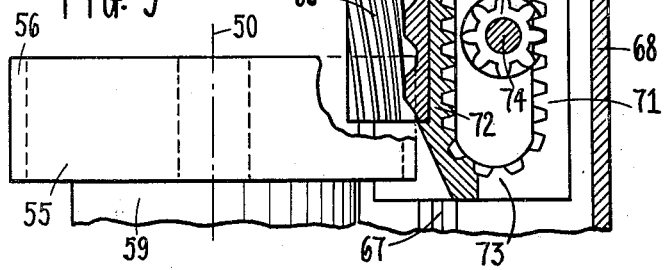
INVENTOR
Ernest Wildhaber

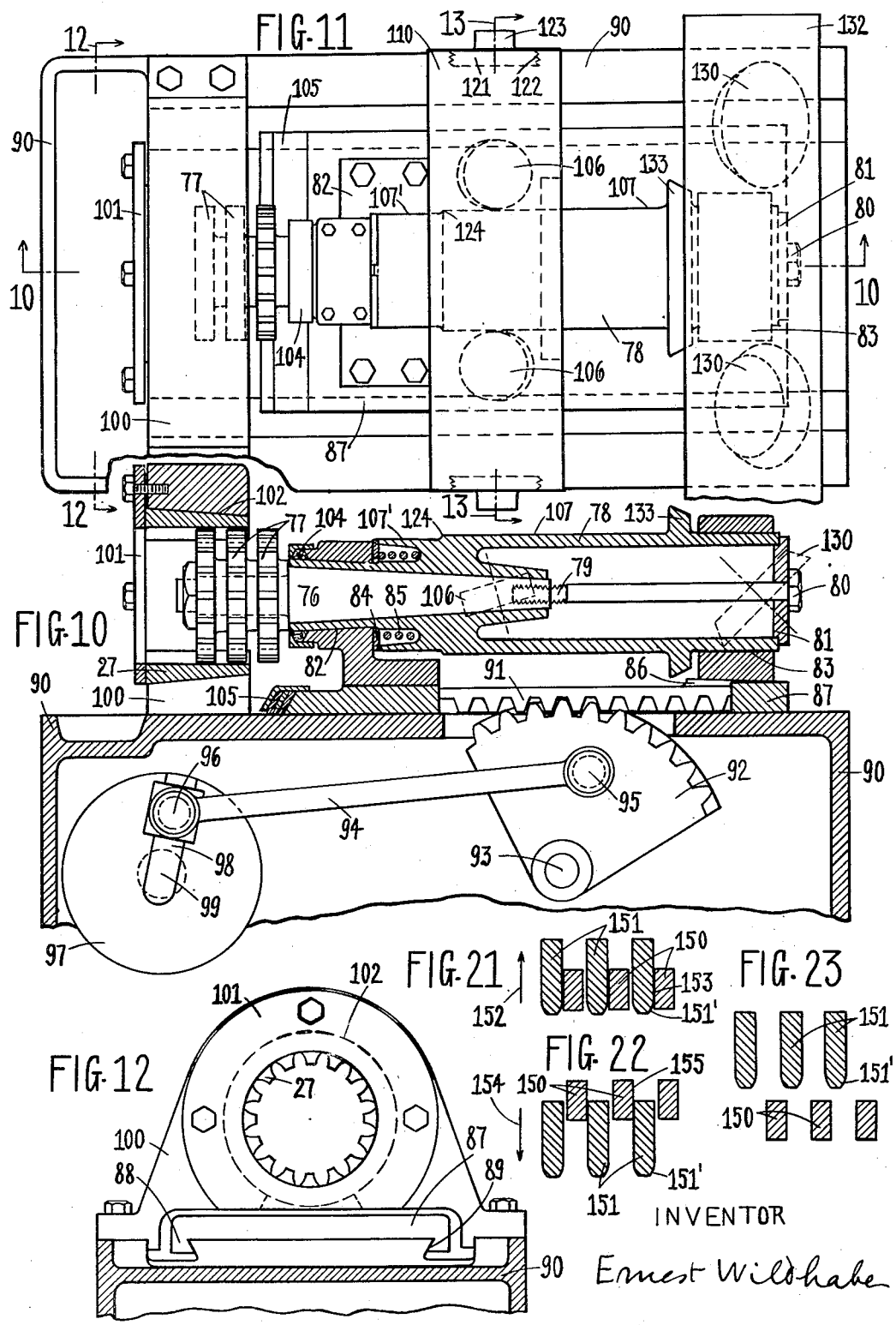

Oct. 4, 1932.   E. WILDHABER   1,881,382
METHOD OF AND MEANS FOR PERFECTING GEARS AND GEAR SHAPED ARTICLES
Filed Feb. 11, 1929   4 Sheets-Sheet 4
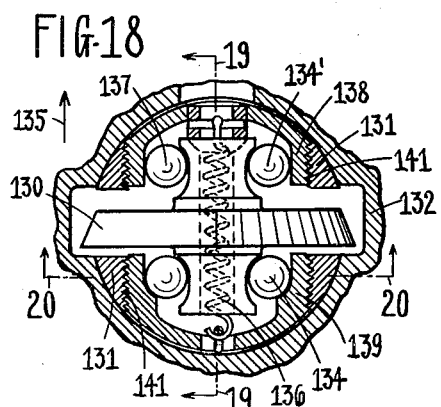
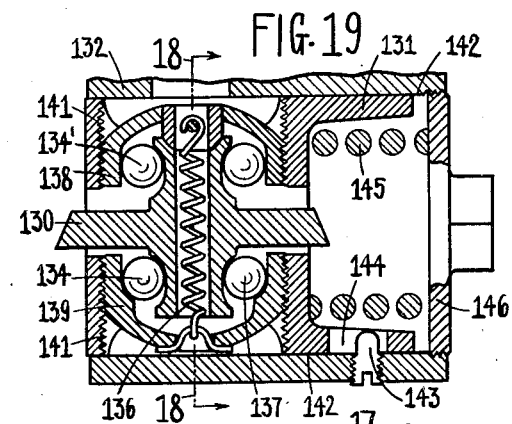
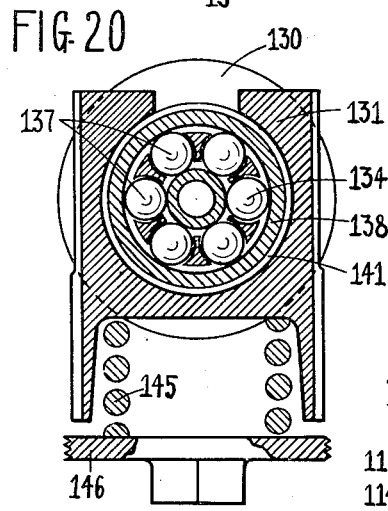
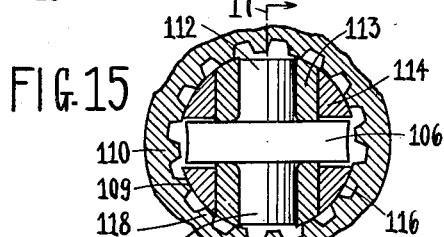
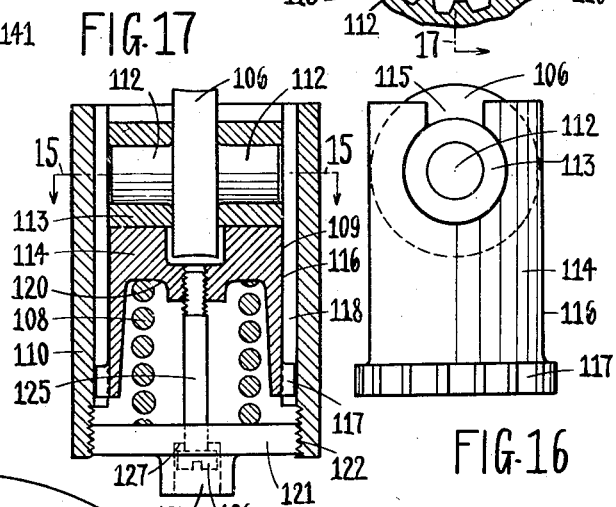
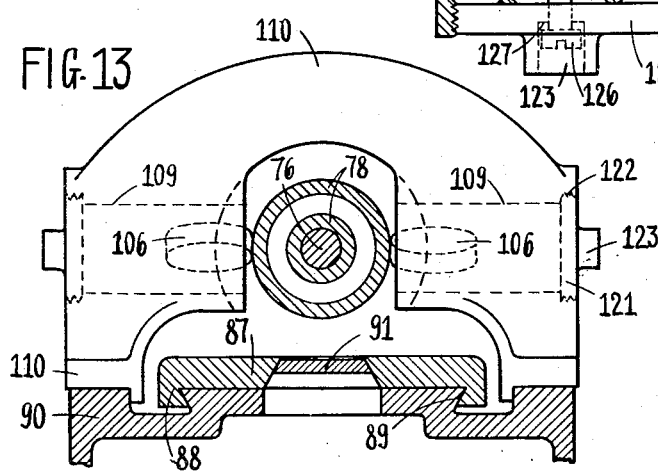
INVENTOR
Ernest Wildhaber Patented Oct. 4, 1932

1,881,382

UNITED STATES PATENT OFFICE

ERNEST WILDHABER, OF ROCHESTER, NEW YORK

METHOD OF AND MEANS FOR PERFECTING GEARS AND GEAR SHAPED ARTICLES

Application filed February 11, 1929. Serial No. 339,018.

The present invention relates to methods of and means for perfecting gears and gear shaped articles, and its principles are broadly applicable to all kinds of gears and gear shaped articles. More particularly the present invention relates to perfecting gears and gear shaped articles containing straight tooth surfaces or helicoidal tooth surfaces, that is to say tooth surfaces having constant profiles in different planes disposed at right angles to the axis of the gears or gear shaped articles.

One object of the present invention is to provide a novel method of and means for increasing the accuracy of gears and especially for correcting errors of tooth spacing, which errors are the most objectionable in gearing. Furthermore a method and means shall be devised for equalizing the tooth profiles, so that the resulting profiles of all the teeth are exactly alike. In addition ways and means shall be devised for correcting profile errors of gear teeth.

In all known processes of forming gears and of perfecting gears the resulting product contains all the errors of the means employed in making the product, and other errors besides. For instance in grinding gears with known processes indexing wheels or masters are used, and the errors contained in the indexing wheels or masters are transmitted to every gear ground, in addition to errors resulting from other sources. A gear ground with any known method is therefore never more accurate than the indexing wheel or master used in its production, and as a rule not as accurate.

One aim of the present invention is to provide a method of and means for directly obtaining gears of high accuracy, and of producing gears of higher accuracy than the means provided for producing them.

A further aim is to devise ways and means for producing accurate gears without the use of indexing wheels or dividing heads, and without relying on master gears.

One chief object of the present invention is to provide a novel, accurate and simple method of perfecting gears after hardening, and to provide an efficient method of eliminating errors incurred through the hardening operation. Another aim is to devise a method of abrading gears, in which the teeth of a gear blank are repeatedly engaged by an abrading member, and in which the two sides of a tooth are alternately engaged so that both sides of the teeth are finished substantially at the same time. Furthermore a method and means shall be devised for commercially perfecting hardened gears to such a degree of accuracy, as has not been hitherto possible.

The importance of high accuracy of gears is readily understood: Inaccuracy means noise, reduced load carrying capacity or short gear life, and selective assembly, which absorbs much time. High accuracy means quiet operation, increased load carrying capacity, and last but not least, interchangeability.

Other objects will appear in the course of the specification and from recital of the appended claims.

My invention will be described with reference to examples illustrated in the accompanying drawings, in which:

Fig. 1 and Fig. 2 are diagrammatic views of a gear blank and of a complementary toothed member, illustrative of certain principles underlying the present invention.

Fig. 3 and Fig. 4 are diagrammatic views of a gear blank and of a complementary toothed segment, illustrative of a way of obtaining profile corrections in accordance with the present invention.

Fig. 5 is a diagrammatic view of a device for perfecting spur gears or helical gears by abrading, in accordance with the present invention.

Fig. 6 is a partial and diagrammatic plan view and section of a machine for perfecting spur gears of large diameter in accordance with my invention.

Fig. 7 is a partial and diagrammatic plan view and section of a machine for perfecting helical gears or herringbone gears, in accordance with a further embodiment of the present invention.

Fig. 8 is a front elevational view corresponding to Fig. 7, and partly a section along lines 8—8 of Fig. 7.

Fig. 9 is a side view corresponding to Fig. 7, and partly a section along lines 9—9 of Fig. 7.

Fig. 10 is a front elevational view, chiefly in section along lines 10—10 of Fig. 11, of a machine for perfecting spur gears and helical gears in accordance with the present invention.

Fig. 11 is a plan view corresponding to Fig. 10.

Fig. 12 and Fig. 13 are end views and sections along lines 12—12 and 13—13 respectively of Fig. 11.

Fig. 14 is a diagram illustrative of a modified disposition of parts, as compared with the machine illustrated in Fig. 10 to Fig. 13.

Fig. 15, Fig. 16 and Fig. 17 are enlarged views of a detail of the machine illustrated in Fig. 10 to Fig. 13. The said three figures illustrate a friction roller and its spring mounting. Fig. 15 can be considered as a plan view and section along lines 15—15 of Fig. 17. Fig. 16 is a front elevational view of the movable parts indicated in Fig. 15. And Fig. 17 is a side view and section along lines 17—17 of Fig. 15.

Fig. 18, Fig. 19 and Fig. 20 are views in an enlarged scale of another detail of the machine illustrated in Fig. 10 to Fig. 13. Fig. 18 can be considered as a plan view of an indexing roller unit, partly a section along lines 18—18 of Fig. 19. Fig. 19 is a section along lines 19—19 of Fig. 18, and Fig. 20 is a section along lines 20—20 of Fig. 18.

Fig. 21, Fig. 22 and Fig. 23 are diagrams explanatory of the operation of the machine illustrated in Fig. 10 to Fig. 13, as applied to perfecting spur gears having straight teeth.

In Fig. 1 numeral 25 denotes a gear blank having teeth 26 formed thereon, which engage a member 27 of the form of an internal gear. Member 27 contains internal teeth 28 which are complementary to the external teeth 26, and which contain a suitable amount of backlash. For the sake of explanation, it will be assumed at first, that gear blank 25 contains a tooth surface 30' which protrudes over the rest of the tooth surfaces 30, and that member 27 is absolutely accurate and contains no tooth error. When the gear blank 25 and member 27 are exactly centered, so that their centers coincide in a point 32, and when gear blank 25 is given a slight angular twist with respect to member 27 to move the tooth surfaces in engagement, tooth contact will evidently be effected at the protruding tooth surface 30'. Tooth surface 30' may then be corrected in accordance with my invention and reduced to the accurate position 30'', indicated in dotted lines, by reciprocating blank 25 relatively to member 27 with a suitable lapping compound provided between the teeth. Reciprocation is effected lengthwise of the teeth and in the direction of the axis (32) of the blank.

If blank 25 is of the form of a spur gear containing straight teeth, the reciprocation consists solely of a translation in the direction of the blank axis (32). If blank 25 contains helical teeth, an angular motion about the blank axis is added to the translation in the direction of said axis, so that the reciprocation then consists of a periodical helicoidal motion about the axis of the blank. In addition the blank and member 27 are periodically disengaged and the blank is then indexed, so that each tooth of the blank successively engages each tooth of member 27. During the reciprocation the teeth are maintained in engagement with a suitable pressure.

It is evident that in this operation the protruding tooth surface 30' is gradually worn down through abrasion to its correct place 30'', and that the teeth 28 of member 27 remain accurate. Although the teeth 28 may also wear to some extent, said wear is uniformly distributed over all teeth 28 and therefore does not affect the tooth surfaces proper.

The described operation therefore corrects the spacing error of the protruding tooth surface 30' by confining abrasion to said protruding surface. Inasmuch as only protruding tooth surfaces effect tooth contact with member 27, only the protruding teeth of gear 25 are worn down. It is an important feature of the present invention, that through its simple disposition protruding tooth sides are automatically located and operation is confined to said protruding tooth surfaces. The larger the spacing error of a tooth surface, that is to say the more a tooth surface protrudes over the average of the teeth, the longer it effects contact with member 27 and the longer it is subject to abrasion.

What holds true for one protruding tooth surface 30' holds also true for other protruding tooth surfaces. When the process of abrasion has been continued a sufficient length of time, the spacing errors of the teeth 26 are all eliminated. The perfected teeth are spaced exactly uniformly and contain exactly the same tooth profile, which is the average of the tooth profiles of the various teeth of the blank and of member 27. In other words the teeth of the perfected gear are all identical.

While thus far it had been supposed that member 27 was absolutely accurate, it will now be demonstrated, that even with a comparatively inaccurate member 27 accurate gears may be obtained, and that a gear perfected according to the present process may be made more accurate than forming member 27 at the outset of the operation.

Reference is made to Fig. 2, in which a gear blank 25 is supposed to contain teeth having periodical spacing errors.

As an example the teeth $34a$, $34b$, $34c$, $34d$ are supposed to protrude by equal amounts $(A)$ over the average of the teeth. Alternate teeth $35a$, $37a$, $35b$, $37b$, $35c$, $37c$, $35d$, $37d$ are supposed to be accurate; and the teeth $36a$, $36b$, $36c$, $36d$ are supposed to recede by the same equal amounts $(A)$ back of the average of the teeth, as teeth $34a$, $34b$, $34c$, $34d$ protrude. In other words teeth $36a$, $36b$, $36c$, $36d$ can be considered as having a negative spacing error $(-A)$.

Toothed internal member 27 is assumed to contain the same periodical errors $(+A)$, 0, $(-A)$, 0 on the teeth $34'$, $35'$, $36'$, $37'$ respectively.

The contact on one side of the teeth will now be considered. The above assumed conditions can be expressed by the table below, in which the first line refers to gear 25, and the second line refers to member 27. The numerals designate the teeth considered. Their spacing errors are indicated in parenthesis.

$$34(+A) \quad 35(0) \quad 36(-A) \quad 37(0)$$
$$34'(+A) \quad 35'(0) \quad 36'(-A) \quad 37'(0)$$

In this table the teeth which are paired in the shown position of gear 25 and member 27 are indicated in the same vertical rows. The teeth 34 of gear 25 are paired with the teeth $34'$ of member 27, as illustrated, and their errors add to $(+2A)$. The combined errors of the paired teeth 35 and $35'$ are zero. The combined errors of the teeth 36 and $36'$ are $(-2A)$; and the teeth 37 and $37'$ contain zero errors.

Tooth contact evidently is effected on the teeth 34 and $34'$ which protrude most towards each other, that is to say on the teeth having a maximum positive combined error. The other tooth pairs do not actually contact with each other, as is clearly indicated in Fig. 2.

When gear 25 has been indexed by one tooth, so that tooth $34a$ gets into the position occupied in Fig. 2 by tooth $35a$, the conditions change in accordance with the table below, which also shows paired teeth in the same vertical rows:

$$34(+A) \quad 35(0) \quad 36(-A) \quad 37(0)$$
$$35'(0) \quad 36'(-A) \quad 37'(0) \quad 34'(+A)$$

A maximum combined spacing error of $(+A)$ is here contained in the pairs 34, $35'$ and 37, $34'$, and accordingly the teeth 34, comprising teeth $34a$, $34b$, $34c$, $34d$, and the teeth 37, comprising teeth $37a$, $37b$, $37c$, $37d$ are making contact in the considered indexed position of gear 25.

The table below shows paired teeth in the same vertical rows after gear 25 has again been indexed by one tooth.

$$34(+A) \quad 35(0) \quad 36(-A) \quad 37(0)$$
$$36'(-A) \quad 37'(0) \quad 34'(+A) \quad 35'(0)$$

In this position the combined spacing error of every pair of teeth is zero, and accordingly all the teeth are in contact.

After gear 25 has been indexed by three teeth, as compared with the position shown in Fig. 2, the conditions can be expressed by the table below:

$$34(+A) \quad 35(0) \quad 36(-A) \quad 37(0)$$
$$37'(0) \quad 34'(+A) \quad 35'(0) \quad 36'(-A)$$

A maximum combined spacing error of $(+A)$ exists on the pairs containing the teeth 34 and 35, and accordingly contact is effected on these teeth.

When gear 25 is further indexed, the conditions expressed by the above four tables are again repeated. The operation consists therefore of four different periods. According to the above the protruding teeth 34 are in tooth contact in all four periods. The correct teeth 35 and 37 are in contact in two periods, namely in the third and fourth tabulated period and in the second and third tabulated period respectively. The receding teeth 36 are in contact only during the third period of the above tabulations.

The protruding teeth are therefore more subject to abrasion than any other teeth, inasmuch as they are abraded twice as long or twice as often as the correct average teeth. As a consequence, protruding teeth are equalized and corrected, even if member 27 is not any more accurate than the gear blank 25. This goes to show that gears of very high accuracy may be directly obtained with the present method.

Preferably member 27 is made already as accurate as commercially possible.

The above explained example represents only one of the possible innumerable combinations. The said combinations contain however the same common broad feature, that protruding teeth of a gear blank enter into tooth engagement more often than accurate teeth and are therefore subject to more abrasion than the latter. The more a tooth protrudes, the more often it effects tooth engagement and the more it is corrected, in accordance with the present invention.

While in Fig. 1 and Fig. 2 members 27 are shown of the form of an entire internal gear, members of segmental form may also be used. Certain additional corrections may be effected by using only a portion of the whole circumference of said internal gear. Preferably at least four teeth are provided, so that at the end of the perfecting operation contact is effected simultaneously on at least four teeth of the gear blank. Fig. 3 and Fig. 4 illustrate gear blanks 25 in engagement with internal segments 40, which contain a plurality, namely four, tooth surfaces complementary to the tooth surfaces of gear 25 and suited to simultaneously engage said tooth surfaces of gear 25.

Fig. 3 and Fig. 4 also illustrate ways of obtaining profile corrections beyond the profile correction effected through equalizing the profiles. While in the main operation a gear blank 25 and its member 27 or 40 are exactly centered, the centers 32 and 41 of gear blank 25 and segment 40 are slightly offset from one another for obtaining said additional profile correction in accordance with Fig. 3 and Fig. 4. If it is desired to remove stock from the root of the teeth of gear 25, the centers 32 and 41 may be offset in the manner indicated in Fig. 3, so that center 41 of the segment is disposed to the inside of center 32 of gear 25. The root portion of tooth profile 43 then effects contact with segment 40. Stock is uniformly taken off the root portions of the various teeth, as gear blank 25 is periodically indexed between reciprocating motions.

To remove stock from the point or upper portion of the teeth, a setting may be used as indicated in Fig. 4. The center 41 of the internal segment 40 is displaced to the outside with respect to center 32, so that contact is effected with the upper portion of profile 44.

A hand operated correcting device is diagrammatically indicated in Fig. 5. A plurality of gear blanks 25, here shown as spur gears, are mounted on a cylindrical arbor 45, which adjacent one end contains a hand wheel 46. Arbor 45 is mounted in open bearings 47. A member 27 is mounted on a stationary frame or base 48 in such manner that it is accurately centered with the gear blanks 25. A suitable lapping compound is provided for abrading the contacting teeth. Arbor 45 is then moved back and forth in the direction of its axis 50 with the hands of the operator holding wheel 46. After every complete stroke, or after every two strokes, or after every given number of strokes, arbor 45 is moved axially so far that the gear blanks 25 leave engagement with internal member 27. The blanks are then indexed while disengaged by turning hand wheel 46, and moved again into engagement with member 27.

During engagement between blanks 25 and member 27, a suitable slight turning moment is exerted on hand wheel 46, so that tooth contact is effected on one side of the teeth. If so desired one side of the teeth may be engaged during axial motion in one direction, and the other side of the teeth may be engaged during axial motion of arbor 45 in opposite direction. This may be effected by reversing the above said turning moment when reversing the direction of axial motion.

Fig. 6 outlines another embodiment of my invention and diagrammatically illustrates a machine for lapping or broadly for perfecting large spur gears. Numeral 51 denotes a spur gear provided with teeth 52, and having an axis 50. Gear 51 engages the teeth of an internal segment 40, which is accurately centered and which is disposed on a slide 53. The latter may be reciprocated in axial direction along guides 54 in any suitable known manner. The principle of operation is the same as described with reference to Fig. 5. Reciprocation is however here attributed to segment 40 rather than to the large and heavy gear 51.

A further embodiment will now be described with reference to Fig. 7, Fig. 8 and Fig. 9. While the principles of this embodiment are broadly applicable, its preferred application lies in perfecting large gears provided with helical teeth, that is to say large helical gears and herringbone gears.

Gear blank 55 containing helical teeth 56 is given a uniform rotation on its axis 50, by means of a worm 57 meshing with a worm wheel 58. The latter is connected with or forms part of table 59, to which gear blank 55 is secured. In the drawings only the main and novel principles of the embodiment are indicated, and adjustment means of known character are omitted. Table 59 is supported axially by a base 60, which engages side 61 of worm wheel 58, and which also forms a radial bearing 62 which rotatably holds hub 63 of the worm wheel 58 or of table 59.

A toothed segment 27 is moved in the direction of gear axis 50 in timed relation to the rotation of gear 55. Segment 27 contains internal helical teeth 65 whose tooth surfaces are complementary to the tooth surfaces of gear blank 55 and is accurately centered with gear 55, at least during the chief perfecting operation. Segment 27 is mounted on a slide 66, which during engagement with gear 55 moves along guides 67 of frame 68, and is maintained in contact with said guides with any suitable spring means omitted in the drawings. Segment 27 and slide 66 are withdrawn from gear 55 before the end of each stroke and brought into a position where sides 69 of slide 66 engage with the sides 67' of frame 68. During the motion of slide 66 out of engagement with gear 55 and into contact with sides 67', the slide is continuously maintained in parallel position by known means not further indicated. Slide 66 is then returned while out of engagement with gear 55, and the forward stroke of slide 66 is again started. After the forward stroke has started, the slide is moved into engagement with gear 55 and with guides 67 by suitable cam means. Movement is imparted to slide 66 by means of a pinion 70, which during the forward stroke engages with a rack 71 connected with slide 66 (see Fig. 9.) The forward stroke is herein understood to be the stroke during which engagement between gear 55 and segment 27 takes place. During the return stroke of slide 66 pinion 70 meshes with a rack 72 which also forms part of slide 66. The two racks 71 and 72 are connected with each other by internal toothed parts 73.

Pinion 70 is given a constant rotary motion, which is timed up with the rotation of gear 55 in such manner that the teeth of segment 27 and of gear 55 are maintained in engagement. Pinion 70 continues to rotate in the same direction and at the same speed when engaging rack 72 and when engaging internal parts 73. Pinion shaft 74 is shown in part only, and is journalled in stationary bearings 75. Power is imparted to the pinion shaft 74 in any suitable known manner. During the engagement of segment 27 and gear 55 one side of the teeth of said segment and gear are continuously maintained in engagement under slight pressure by suitable known means not indicated.

The correction of the gear errors and the perfection of the gear is effected in the same general manner as previously described: Protruding teeth of the blank effect tooth contact more often than correct teeth or receding teeth, and are therefore subject to chief abrasion. In the instances described with reference to Fig. 6 to 9 corrected gears (51 or 55) may be produced which are more accurate than the worm wheel (58), whose function is merely to move the gear.

A preferred embodiment for perfecting spur gears and helical gears or herringbone gears in accordance with my invention will now be described.

In Fig. 10 to Fig. 13, numeral 76 denotes a tapered arbor, on which a plurality of gear blanks 77 are mounted. Arbor 76 is rigidly secured to a hollow shaft 78 by means of a screw 79, which engages a threaded portion provided in arbor 76 adjacent its tapered end. The head 80 of screw 79 rests on a plate 81, which is secured to shaft 78. Shaft 78 is rotatably mounted in bearings 82, 83. Bearing 82 engages a tapered portion of shaft 78 and a disk 84, which is angularly fixed to shaft 78, and which is pressed to bearing 82 by means of a spring 85. Through the action of said spring shaft 78 is maintained tightly in bearing 82, regardless of wear. Bearing 83 is a cylindrical bearing which may be adjusted on an inclined base 86, to take up wear. The two bearings 82, 83 are mounted on a slide 87 provided with dove tail projections 88, and is movable along guides 89 of machine frame 90. Known means for taking up wear of the dove tail projections are provided but omitted in the drawings.

A rack section 91 is inserted to slide 87 and rigidly secured to it. Rack 91 meshes with a toothed segment 92 which may be rocked or oscillated on its axis 93 by means of a rod 94. One end of rod 94 is pivoted on a pin 95 secured to segment 92, and its other end engages a crank pin 96, which may be rigidly secured to a disk 97, and which is adjustable in a slot 98 of said disk for effecting different crank radii. Disk 97 is integral with shaft 99, which is rotated in any suitable known manner. From the above it is understood that rotation of shaft 99 effects oscillation of segment 92 and reciprocation of slide 87.

Any other means for effecting reciprocation of slide 87 might be provided in place of the means described, if so desired.

An internal toothed member 27 is secured to a yoke 100 by means of a disk 101 which is screwed to yoke 100 and which presses toothed member 27 into a tapered opening 102 of said yoke. Yoke 100 is secured to the machine frame 90. Before the operation of the machine, internal toothed member 27 and arbor 76 are carefully centered, with known means omitted in the drawings.

As a rule, a suitable lapping compound is provided between the contacting tooth surfaces of blanks 77 and member 27. Said lapping compound consists of an abrasive mixed with oil or grease, or with any other suitable fluid or semifluid. Member 27 is then made of metal or of another suitable solid substance.

If so desired, member 27 may be made of an abrasive substance held together by a solid binding material, that is to say member 27 may be made of the same material as known grinding wheels. In this case member 27 acts directly as an abrasive, and no lapping compound is then needed for the abrasive operation.

For obtaining a final finish and a high degree of polish, preferably a lapping compound or lapping mixture of very fine grain is provided.

In all cases it is desirable to prevent the abrasive from penetrating into the bearings of shaft 78 and between slide 87 and machine frame 90. With this aim in mind, a stuffing box 104 may be disposed in front of bearing 82, and suitable small plates 105 disposed at an angle are provided on the front end of slide 87. Plates 105 are indicated in Fig. 10, but omitted in other figures. They tend to shave the surface underneath clean of abrasive.

The means for holding the blanks 77 in contact with internal member 27 with a desirable amount of pressure will now be described. Two rollers 106 are disposed to engage the cylindrical surface 107 of shaft 78 on opposite sides, and are pressed radially towards surface 107 by means of springs (108). Rollers 106 and their spring mounting will be more particularly described hereafter with reference to Fig. 15 to Fig. 17.

Rollers 106 are mounted in cylindrical slides, which are disposed in cylindrical bores 109 of a yoke 110, see Fig. 13. Yoke 110 is rigidly secured to the machine frame 90. For convenience yoke 110 and yoke 132 described hereafter are omitted in Fig. 10.

In the figures referred to, rollers 106 are shown angularly set in a manner corresponding to spur gear blanks 77 containing straight teeth. The rollers are set at a slight angle to the direction of the teeth of blanks 77, which in the instance illustrated are parallel to the axis of arbor 76. It is noted that the two rollers 106 are inclined in opposite directions, see Fig. 13, namely in such manner that the position of one roller could be derived from the position of the other roller through rotation about the axis of arbor 76.

When slide 87 is moved in one direction along guides 89, for instance in a direction from right to left, the rollers 106 tend to turn shaft 78 in the direction of their peripheral motion. The roller disposed in front tends to move the periphery of shaft 78 downwardly, and the roller disposed in the rear tends to move the periphery of shaft 78 upwardly. In other words as slide 87 moves from right to left, both rollers tend to turn shaft 78 in the same direction and thereby exert a turning moment on shaft 78, so that one side of the teeth of the gear blanks 77 is kept in engagement with internal member 27. This turning moment is the result of a certain amount of slippage of the rollers on shaft 78. The rollers which are pressed to the surface of shaft 78 present no appreciable amount of resistance in the direction of their own periphery, but considerable frictional resistance in the direction of their axis. On account of the inclination of the rollers, their relative motion with respect to shaft 78 is not a pure rolling motion, but it also contains a component of slippage in a direction parallel to the axes of the rollers. This latter component effects the friction moment, which maintains one side of the teeth of the blanks 77 in engagement with internal member 27.

The pressure between rollers 106 and shaft 78 may be regulated by adjusting the above said springs (108), and the frictional moment exerted on shaft 78 may thereby be set to any desirable amount.

When the motion of slide 87 is reversed, that is to say when slide 87 moves from left to right, the frictional moment exerted by the rollers is reversed: The front roller tends to move the periphery of shaft 78 upwardly, and the rear roller tends to move said periphery downwardly. As a result the other side of the teeth of blanks 77 is kept in engagement with internal member 27.

One side of the teeth is operated on during motion of slide 87 in one direction, and the opposite side of the teeth is operated on during motion of slide 87 in opposite direction. Both sides of the teeth of the gear blanks are therefore successively subject to abrasion in each complete reciprocation of slide 87.

Rollers 86 and their spring mounting will now further be described with reference to Fig. 15, Fig. 16 and Fig. 17.

Roller 106 is made integral with its journals 112, which are rotatably mounted in ring shaped bearings 113. The latter are inserted to a plunger 114, which contains a suitable slot for receiving roller 106, and other slots 115, which are helpful in mounting the roller. Plunger 114 contains a cylindrical surface 116 and a gear like projection 117 disposed on the end opposite roller 106. The cylindrical bore 109 of yoke 110 contains internal teeth 118, which fit the teeth of projection 117, and which thereby maintain plunger 114 in a fixed angular position. The angular position of plunger 114 and therefore the inclination of roller 106 may be changed by disengaging projection 117 and teeth 118, and by reengaging said projection and teeth after indexing the plunger by a suitable number of teeth.

A spring 108 engages a cup shaped recess 120 of plunger 114 and presses the plunger in the direction of bore 109 towards shaft 78, while the teeth 118 maintain the plunger in a constant angular position. The other end of spring 108 bears against a threaded cover 121, which engages a thread 122 provided on the outward end of bore 109. Cover 121 contains a square projection 123, with which it may be turned and moved further in or further out in thread 122, thereby increasing or reducing the pressure of spring 108.

Yoke 110 and with it rollers 106 are so set along the frame of the machine, that the rollers reach the end 124 of cylindrical surface 107 in the position of slide 87, which corresponds to complete disengagement of blanks 77 and internal member 27. A surface 107' of smaller diameter is disposed adjacent surface 107. The diameter of this surface 107' is made small enough to stop the action of rollers 106. The motion of plunger 114 is namely limited by a stop, which prevents motion of plunger 114 to the extent of preventing contact of roller 106 with surface 107'. The said stop consists of a threaded rod 125 secured to a threaded hole of plunger 114, see Fig. 17, and whose head 126 stops motion of plunger 114 when reaching the bottom of a hole 127 provided on cover 121.

After having thus described the means for keeping rollers 106 out of action after disengagement of the blanks 77 and member 27, means for indexing the blanks will now be described. Further rollers 130 (see Fig. 10 and Fig. 11) are disposed on plungers (131) mounted in cylindrical bores of a yoke 132, which is secured to the machine frame 90. Rollers 130 may be set at an angle of 45 degrees, as may be seen from consideration of Fig. 10 and Fig. 11, in which former figure the front rollers 106 and 130 are indicated in dotted lines. They are pressed towards shaft 78 by springs. Their motion towards shaft 78 is limited by a suitable stop. Rollers 130 engage a disk like projection 133 of shaft 78, when the latter is in a position corresponding to disengagement between blanks 77 and internal member 27. In other words, when the action of rollers 106 ceases, the rollers 130 start to engage projection 133 and take over control of shaft 78.

Projection 133 is provided with a tapered outside surface, and rollers 130 are also made tapered.

From the description of rollers 106 the action of rollers 130 will also be readily understood. As slide 87 moves from left to right and thereby increases the distance between blank 77 and internal member 27, the two rollers 130 tend to turn shaft 78 in the same direction as rollers 106 did, but with increased power. The blanks 77, which then have left the hold afforded by internal member 27, are thereby turned a suitable amount, which can be regulated with the position of yoke 132 lengthwise of the machine frame. In other words, the angle by which the blanks are turned depends on the distance covered by slide 87 while in engagement with rollers 130.

If rollers 130 were of exactly the same construction as rollers 106, the angular motion of blanks 77 would again be reversed during the motion of slide 87 from right to left. In order to avoid reversal of the angular motion of the blanks, that is to say in order to keep the blanks indexed, provision is made to render rollers 130 inactive or partly inactive during the return (from right to left) of slide 87. It has been explained above, that the capacity of a roller to exert a turning moment is based on its large frictional resistance opposed to displacement in the direction of its axis. To avoid such frictional resistance during the return of slide 87, the rollers 130 are axially fixed on one side only, namely on the right side, and may freely move a suitable distance to the left side along their axes. The detail construction will be further described hereafter. As slide 87 starts to move to the left, the rollers 130 turn on their axes and move lengthwise of their axes. It can be demonstrated, that the axial motion of rollers 130 is smaller than the corresponding motion of slide 87, and that for this reason the tapered rollers and tapered projection 133 disengage, after the plungers 131 have arrived at their stop. The blanks thus reengage member 27 in an indexed position.

While I have shown a novel and simple indexing arrangement, it is understood that any suitable known indexing device might be provided in place of the one described, without departing in the least from the principles of perfecting gears in accordance with my invention. Also it is clear that in place of double rollers, which balance each other, single rollers might be provided.

The detail construction of rollers 130 and of their spring mounting will now be explained with reference to Fig. 18, Fig. 19 and Fig. 20. A roller 130 is mounted in ball bearings 134, 134' of such construction as to permit of a certain amount of axial displacement of the roller in the direction of arrow 135. Before its engagement with projection 133, roller 130 is kept in the axial position indicated in the drawings, by a light spring 136, which occupies the hollow center of roller 130 and of the shaft integral with said roller.

The balls 137 of bearings 134, 134' roll in outside races 138, 139 which are secured to a cylindrical plunger 131 by means of screw threads 141. Plunger 131 is prevented from turning in its cylindrical bore 142 by means of a threaded pin 143, which projects into a slot 144 of plunger 131, and which also acts as a stop of the motion of plunger 131 lengthwise of bore 142. A cup like portion of plunger 131 contains a spring 145 which rests on a cover 146. The latter is secured to the end of bore 142 by means of screw threads provided on its periphery. The pressure of roller 130 against projection 133 may be regulated or adjusted by turning cover 146 in its threads.

The machines illustrated in the drawings are primarily adapted to perfect gears or gear shaped articles containing constant profiles in planes perpendicular to their axes. The tooth surfaces of such gears or articles are either helicoidal surfaces or cylindrical surfaces, that is to say in the latter case surfaces extending parallel to the axis of the gear or article. In other words the present invention applies specifically to all articles, which contain a plurality of equal surfaces disposed about an axis at equal angular intervals and extending along helices or along lines parallel to said axis. An example of a gear shaped article is a relieved cutter of gear form for planing gears. Such cutters and other articles of the character stated are termed hereafter broadly gears, and the appended claims have been drawn with this broad meaning of the term gear.

The example illustrated in Fig. 10 to Fig. 13 has been particularly described as used for perfecting gears containing straight teeth; but it is understood that the same general operations apply also to perfecting gears with helical tooth surfaces. In the latter case also a member (27) of the form of an internal gear is provided. The frictional rollers 106 are again used for maintaining opposite sides of the teeth in engagement with the internal member (27) during reciprocation of slide 87 in opposite directions. They are however set at different angles, namely at a slight angle to the direction of a helix having the same lead as the teeth of the gear blank, as will be readily understood. While slide 87 is reciprocated, the helical gear blanks perform a helicoidal reciprocation, that is to say a reciprocation composed of a translation and of an angular motion on the axis of the gear blanks. The described method of indexing, or any other method may be used, as in the case of perfecting spur gears. In general whenever simplicity of construction is especially desirable frictional means are preferably provided for indexing.

To facilitate reengagement between the blanks and internal member (27) the teeth of the latter are preferably rounded on the side where engagement takes place. This is illustrated with respect to perfecting spur gears in the diagrams Fig. 21 to Fig. 23, which further explain different phases of the perfecting operation. A few teeth 150 of a spur gear blank, and a few teeth 151 of an internal member (27) are indicated in development, the cylindrical pitch surface of the gear blank and of the internal member having been developed into the drawing plane. Teeth 151 are provided with rounded ends 151'. Fig. 21 illustrates motion of the gear blank in direction of arrow 152 relatively to the internal member, with side 153 of the teeth 150 in engagement with the internal member. Fig. 22 shows motion of the gear blank in opposite direction, namely in the direction of arrow 154. During this motion the opposite side 155 of teeth 150 is in engagement with the internal member and thereby undergoing abrasion. Fig. 23 illustrates the indexing period, with the gear blank and the internal member out of engagement.

The gear blanks 77 are reciprocated in the direction of their axis in the manner that they are disengaged preferably once per complete reciprocation.

Diagram Fig. 14 outlines a disposition, in which the axis of the gear blanks 77 is disposed vertical and where said blanks are reciprocated in vertical direction. In this arrangement a cup 156 is formed underneath internal member 27. This cup may be filled with lapping compound, so that at least one of the gear blanks 77 dips into said compound at every stroke of reciprocation, and through its motion maintains the contacting surfaces well covered with said compound.

In the horizontal disposition of the gear axis, lapping compound may be put on the teeth either once per finishing operation, or periodically, or in a continuous flow, as may be desired.

As a practical safety device, a friction clutch is preferably provided in the means for effecting reciprocation of slide 87, to prevent any damage if, through faulty adjustment of the machine, engagement between the gear blank and its internal member (27) should not be well accomplished. Such friction clutch may be disposed either coaxially with segment 92 or coaxially with shaft 99, and is omitted in the drawings.

Numerous modifications may be made in my invention by simply applying the customary practice or the established knowledge of the art and without departing from the spirit of my invention. For definition of its scope I rely on the appended claims.

What I claim is:

1. In a device for perfecting gears by abrading, a carrier for mounting a gear blank, a member suited to engage the teeth of said blank, means for reciprocating the blank in the direction of its axis, a roller having an axis inclined to a plane perpendicular to the axis of said blank, and a spring for pressing said roller towards said carrier.

2. In a device for perfecting gears by abrading, a carrier for mounting a gear blank, a member suited to engage the teeth of said blank, means for reciprocating the blank in the direction of its axis, a roller having an axis inclined to a plane perpendicular to the axis of said blank, an adjustable spring for pressing said roller towards said carrier, and frictional means for indexing the blank.

3. The method of perfecting spur gears by abrading, which consists in providing a blank having straight teeth formed therein and a toothed member other than its mating gears, said member being suited to contact simultaneously with a larger number of finished teeth of said blank than any gear conjugate to the finished gear blank and mounted on an axis parallel to the blank axis, said number being at least four, in positioning said blank and said member in engagement with each other on a fraction only of the circumference of the blank, and in effecting relative motion lengthwise of the axis of said blank and angularly about said axis between said blank and said member in abrasive engagement with each other.

4. The method of perfecting gears by abrading, which consists in providing a substantially cylindrical blank having teeth formed therein and a toothed member other than its mating gear, said member being suited to contact simultaneously with at least fifty percent more finished teeth of said blank than said mating gear and than any gear conjugate to the finished gear blank and mounted on an axis parallel to the blank axis, in positioning said blank and said member in engagement with each other on a fraction only of the circumference of the blank, and in effecting relative motion between said blank and said member in abrasive engagement with each other.

5. The method of perfecting gears by abrading, which consists in providing a substantially cylindrical bank having teeth formed therein and a segment complementary to the finished teeth of said blank, said segment being suited to contact simultaneously with at least fifty percent more finished teeth of said blank than any gear conjugate to the finished gear blank and mounted on an axis parallel to the blank axis, in positioning said blank and said segment in engagement with each other on a fraction only of the circumference of the blank, and in effecting relative motion between said blank and said segment in abrasive engagement with each other.

6. The method of perfecting gears by abrading, which consists in providing a substantially cylindrical blank having teeth formed therein and a toothed member other than its mating gear, said member being suited to contact simultaneously with at least fifty percent more finished teeth of said blank than said mating gear and than any gear conjugate to the finished gear blank and mounted on an axis parallel to the blank axis, in positioning said blank and said member in engagement with each other on a fraction only of the circumference of the blank, in continuously turning the blank on its axis, and in effecting additional relative motion between said blank and said member in abrasive engagement with each other.

ERNEST WILDHABER.